United States Patent
Stevens et al.

(10) Patent No.: US 7,433,068 B2
(45) Date of Patent: Oct. 7, 2008

(54) DIGITAL TRANSMITTER DEVICE

(75) Inventors: Chad Stevens, Boise, ID (US); Erica Saxton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 10/222,331

(22) Filed: Aug. 15, 2002

(65) Prior Publication Data

US 2004/0032624 A1    Feb. 19, 2004

(51) Int. Cl.
G06K 15/00     (2006.01)
G06F 1/00      (2006.01)

(52) U.S. Cl. ............. 358/1.15; 358/442; 358/402; 358/505; 358/400; 379/100.17; 379/93.32

(58) Field of Classification Search ............ 358/1.15, 358/403, 408, 402, 442, 473, 407; 707/203, 707/500; 709/217, 206; 379/100.08
See application file for complete search history.

(56) References Cited

U.S. PATENT DOCUMENTS

| | | | |
|---|---|---|---|
| 6,023,345 A * | 2/2000 | Bloomfield | 358/402 |
| 6,608,707 B1 * | 8/2003 | Han | 358/497 |
| 6,625,642 B1 * | 9/2003 | Naylor et al. | 709/206 |
| 6,633,913 B1 * | 10/2003 | Chalstrom et al. | 709/226 |
| 6,707,580 B1 * | 3/2004 | Bloomfield | 358/402 |
| 6,707,581 B1 * | 3/2004 | Browning | 358/473 |
| 6,731,410 B2 * | 5/2004 | Saito et al. | 358/468 |
| 6,782,402 B1 * | 8/2004 | Hidaka et al. | 707/203 |
| 6,804,016 B2 * | 10/2004 | Hashimoto et al. | 358/1.13 |
| 6,833,936 B1 * | 12/2004 | Seymour | 358/473 |
| 7,023,573 B2 * | 4/2006 | Ohhashi et al. | 358/1.15 |
| 7,106,464 B1 * | 9/2006 | Brylov | 358/1.15 |
| 7,221,800 B2 * | 5/2007 | Sesek et al. | 382/229 |
| 2002/0091778 A1 * | 7/2002 | Hosoi | 709/206 |
| 2003/0233476 A1 * | 12/2003 | Henry | 709/245 |

* cited by examiner

*Primary Examiner*—Edward L. Coles
*Assistant Examiner*—Negussie Worku (57) ABSTRACT

A digital transmitter device to execute a network browser application to access an e-mail account of an e-mail server and retrieve data stored in thereat. The digital transmitter device can scan and send an image to a network address along with the retrieved data.

25 Claims, 6 Drawing Sheets

DIGITAL TRANSMITTER DEVICE

FIELD OF THE INVENTION

The present invention relates generally to peripheral devices, and more particularly to a digital transmitter device.

BACKGROUND OF THE INVENTION

Many peripherals to computer networks include a scanner component. One example of such a peripheral is an "All-in-one", also known as a multifunction peripheral (MFP) in that it has the capability to perform the multiple functions of scanning hardcopy documents, copying, digital sending, and printing. Another example is a digital network copier that scans in documents from an automatic document feeder, does high volume copying, and has the capabilities of binding, collating, folding, stacking, stapling, stitching, edge-trimming, paginating, and printing on substrates of varied composition. Each of these peripherals, when in communication with an interconnected network, can also be described as being a digital transmitter device. A digital transmitter device is an appliance that has an input device (e.g. a keyboard), a display, and a scanner. The digital transmitter device need not have a printer. A digital camera is a type of digital transmitter device, but in comparison to the foregoing, it is not as useful for handling documents and typically lacks the resolution and ability to rapidly and repetitively transfer information after scanning to a repository.

In an exemplary digital transmitting operation, a hardcopy of a document or other physical object can be presented to the scanner portion of a digital transmitter device. After scanning, the digital transmitter device transforms the scanned image into a digital representation that is then saved in a data format, such as in a bit map data format or in a Portable Document Format (PDF). Electronic messaging can be used to send an electronic mail (e-mail) message from the digital transmitter device with an attachment of the digitized representation in the data format. The e-mail message can be sent to recipients over the interconnected network, where the recipients have an e-mail address that a user manually enters at the digital transmitter device or that a user specifies using a predefined defined list of recipient e-mail addresses that can be stored in a memory of the digital transmitter device.

While digital transmitter devices are convenient, they lack the functionality required for sophisticated e-mail messaging. Current default messages used by digital transmitter devices when sending e-mail are impersonal. Adding new items associated with e-mail addressing and messaging, such as new address book entries, footers for e-mail messages, formatting for e-mail messages, etc. is difficult. Current digital transmitter e-mail capabilities are few and difficult to use. Moreover, adding such e-mail functionality to a digital transmitter device can complicate the firmware of the digital transmitter device. It would be beneficial to be able to use Internet E-mail functionality with a digital transmitter device without complicating or adding expense to the digital transmitter device. Consequently, there is a need for methods, apparatuses, digital transmitter devices, and programs that can provide such a capability.

SUMMARY OF THE INVENTION

The above-stated needs and/or others are met, for example, by a digital transmitter device having one or more processors to execute a network browser application to access an e-mail account of an e-mail server and retrieve data stored in connection with the e-mail account. Apparatus associated with the digital transmitter device scans and sends an image to a network device with the retrieved data.

These and other features of the present invention will become more fully apparent from the following description and appended claims, or may be learned by the practice of the invention as set forth hereinafter.

DESCRIPTION OF THE DRAWINGS

A more complete understanding of the various methods, apparatuses, digital transmitter devices, and programs of the present invention may be had by reference to the following detailed description when taken in conjunction with the accompanying drawings wherein the same reference numbers are used throughout the drawings to reference like components and features, and wherein.

DETAILED DESCRIPTION

The methods, apparatuses, digital transmitter devices, and programs described herein, according to various embodiments of the present invention, relate to the transmission of message data in an electronic mail (e-mail) from a digital transmitter device to a specific e-mail address. The message data includes an image that is captured by the digital transmitter device using a scanning mechanism. The message data also includes data obtained from an electronic mail (e-mail) account that is accessed by the digital transmitter device. The digital transmitter device accesses the data associated with the e-mail account by using a browser application that is executed by the digital transmitter device to log on and gain access to the e-mail account associated with an e-mail server.

The data associated with the e-mail account can include the specific e-mail address to which the digital transmitter device will transmit the message data in the e-mail. Thus, the message data in the e-mail includes the address to which the e-mail will be transmitted.

A user of the digital transmitter device can access an e-mail account to obtain data that is stored in connection with the e-mail account. All or a portion of this data can be used to form the message data of the e-mail that is to be transmitted. This data can include, in addition to an address book of e-mail addresses, one or more text templates into which text and other input is to be inserted by the user, one or more banners, one or more advertisements, one or more emoticons, one or more logos, one or more clip art items, one or more icons, one or more signatures, one or more media files, one or more data or application files, one or more executable files, etc.

After the user has used the browser application to access the e-mail account and has retrieved data stored thereat for use in constructing e-mail messages, the user can then send the constructed e-mails to the designated e-mail addresses obtained from retrieved data in addition to any manually entered information. The digital transmitter device then transmits the message data in each e-mail to the respective e-mail addresses through the same interconnected network the digital transmitter device used to access the e-mail server that maintains the e-mail account. Thus, the digital transmitter device is in communication with the e-mail server through the interconnected network. Once the user indicates that the constructed e-mails are to be sent, any image captured at the digital transmitter device will be sent to the designated e-mail addresses. Typically, the digital transmitter device will open a connection with each e-mail server for each designated e-mail address, and then transmit the respective message data to the respective e-mail address at the respective e-mail server.

In one embodiment of the present invention, the digital transmitter device can include an input device that a user can use to input text and numbers so that a browser application executing on the digital transmitter device can access a designated e-mail account at an e-mail server. Once such access has been gained, the input device can be used by the user to selected portions of the data associated with e-mail account to retrieve, such as one or more e-mail addresses from among one or more lists of e-mail addresses stored in the data associated with the e-mail account. The input device can be a keyboard, a touch sensitive menu screen, or other conventional input mechanism.

A display at the digital transmitter device can be a touch sensitive menu screen or other small form factor display device. The display can be that of a menu page having selectable menu items. These menu items can include menu items that will permit the digital transmitter device to accept input. This input can be a Universal Resource Locator (URL) of an e-mail server at which an e-mail account is maintained, a User ID and password to access the e-mail account, a command to perform a scan function using a scanning mechanism associated with the digital transmitter device, a command to view e-mail account data, a command to select certain data to retrieve that is associated with the e-mail account, etc. Other functions can be performed by request of the user using the input device, such as retrieving e-mail received at the e-mail account, printing retrieved e-mail, reading retrieved e-mail, deleting e-mail, writing e-mail to be sent from the digital transmitter device, saving data into a data storage associated with the e-mail account, managing information with respect to the e-mail account, etc. In short, the digital transmitter can be used to operate a network browser such that any function that can be performed by the browser with respect to an e-mail account can be initiated at the digital transmitter device.

It is preferred that the digital transmitter device include a processor for execution of respective programs associated with each selected menu item, where the selection of one of the menu items initiates the execution of a respective program by the processor. When the scanning menu item is selected, the digital transmitter device captures an image with the scanning mechanism by optically scanning an object to form corresponding scanned object data. The digital transmitter device can form in message data both the designated e-mail address retrieved from the e-mail account and the scanned object data for subsequent transmission as described above. The subsequent transmission from the digital transmitter device to the designated e-mail address can be over a channel that is established by a wireless or a wired link.

Exemplary System for Configuration of a Digital Transmitter Device

Figure 1:
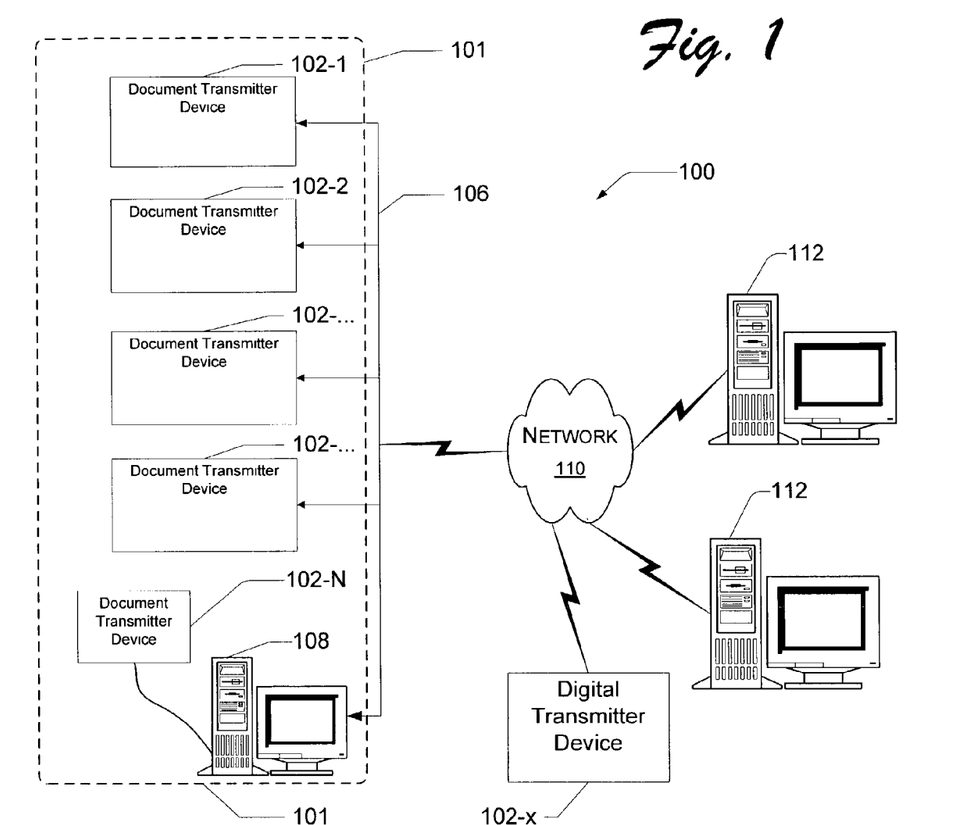
FIG. 1 is a block diagram, according to an embodiment of the present invention, depicting a computing and communication environment having digital transmitter devices in a system environment suitable for providing local access to the digital transmitter devices.

FIG. 1 illustrates an example of a system environment 100 suitable for implementing an embodiment of the present invention. The system environment 100 contemplates local access to one or more digital transmitter devices 102-1 through 102-N. The local access can be provided through an input device, such as a touch sensitive menu screen, on each digital transmitter device 102. A user accesses the input device for the purpose of entering commands, a URL of an e-mail server, a User ID and password for an e-mail account, etc. Each digital transmitter device 102 is in communication with an interconnected network 110. A local area network 101 has a link 106 for connecting a host computer 108 to digital transmitter devices 102-1 through 102-N. Other digital transmitter devices, such as a digital transmitter device 102-x is directly connected to interconnected network 110. Other host computers 112 can be one or more e-mail servers or other network resources, each being in communication with each digital transmitter device 102 through interconnected network 110.

Digital transmitter devices 102-1 through 102-N generally include peripheral devices and stand-alone devices. Peripheral devices include devices such as printers, scanners, copiers, and fax machines, or multifunction peripheral (MFP) devices that combine two or more peripheral devices into a single device. Stand-alone devices include certain peripheral devices that often function while uncoupled or isolated from other devices.

Digital transmitter devices 102 are generally distinguishable from devices such as laptop PCs (personal computers) and pocket PCs by their limited purpose and limited user interface or input/output capabilities. For example, a typical user interface for a digital transmitter device 102 includes a front menu panel with limited screen space and a limited number of buttons. In addition, a digital transmitter device 102 is typically oriented toward performing one general task such as scanning. By contrast, devices such as laptop and pocket PCs often provide multiple and varied means of input/output such as a full screen display, a QWERTY keyboard, a trackball mouse, speakers, microphones, PCMCIA (Personal Computer Memory Card International Association) slots, portable media drives and the like. These devices are capable of performing multiple functions through executing various software applications such as word processing applications, spreadsheet applications, financial applications, network browsers and network messaging applications.

Interconnected network 110 is representative of one or more communication links, either wired or wireless, that are capable of carrying data between digital transmitter device 102 and other network resources in communication with interconnected network 110. In certain exemplary implementations, interconnected network 110 includes a local area network (LAN), a wide area network (WAN), an intranet, the Internet, or other similar network. Host computers 112 as seen in FIG. 1 are typically coupled to interconnected network 110 through a network connection.

Figure 2:
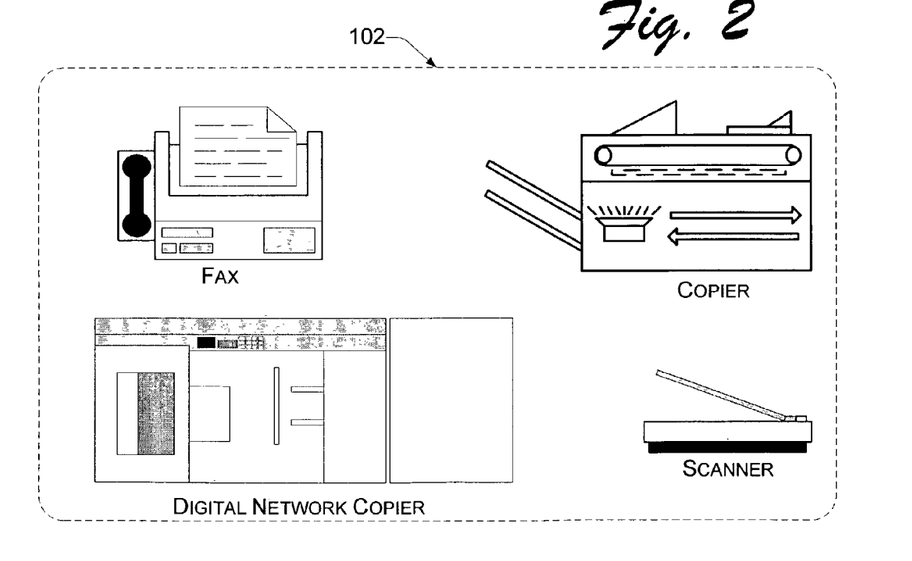
FIG. 2 illustrates various digital transmitter devices that provide local access for input thereto according to an embodiment of the present invention.

FIG. 2 shows a variety of digital transmitter devices 102 that can be in communication with interconnected network 110 through a wired or wireless link. These digital transmitter devices 102 can have capabilities that include, by a way of example and not by way of limitation, that of a digital camera, a portable hand held scanner, a multifunction peripheral (MFP), a facsimile machine, a desk top scanner, stand alone digital transmitter, and a digital press or other high volume copier that includes the capabilities of printing on substrates of varied composition, binding, collating, folding, stacking, stapling, stitching, edge-trimming, and paginating. Each digital transmitter device 102 has an input device to receive a URL of an e-mail server and a log on sequence of an e-mail account at the e-mail server. Each digital transmitter device 102 also has an imaging or scanning mechanism to receive an image of an object. The input URL and log on sequence can then be used by a browser application executing on the digital transmitter device to open a dialog with the e-mail server, to gain access to the e-mail account, and to perform various network browser functions as are permitted by the e-mail account address. Any data retrieved from the e-mail account can be included with the scanned image of the object to be sent by the digital transmitter device in an e-mail message to one or more e-mail addresses each of which can also be obtained from the data associated with the e-mail account.

The user of digital transmitter device 102 can transmit message data from digital transmitter device 102 to interconnected network 110 by a wired or wireless link. Thus, a wireless transmission to interconnected network 110 can be through an Infrared (IR) data connection which can be implemented through the use of infra-red (IR) data ports, and/or radio frequency (RF) link, or other wireless data connections such as the Blue Tooth protocol. A wired link can be performed through a standard network or phone cable, Universal Serial Bus (USB) data connection, a serial port connection, a parallel port connection, an IEEE 1384 ("Fire Wire"™) wire connection, or via other known data transmission standards and modes. By way of example, digital transmitter device 102 can include the capabilities of a cordless handset telephone, a personal digital assistant (PDA), a portable computer, a pager, a watch and the like, any of which is also capable of transmitting data in a wireless manner.

Exemplary Embodiment of a Digital Transmitter Device

Figure 3:
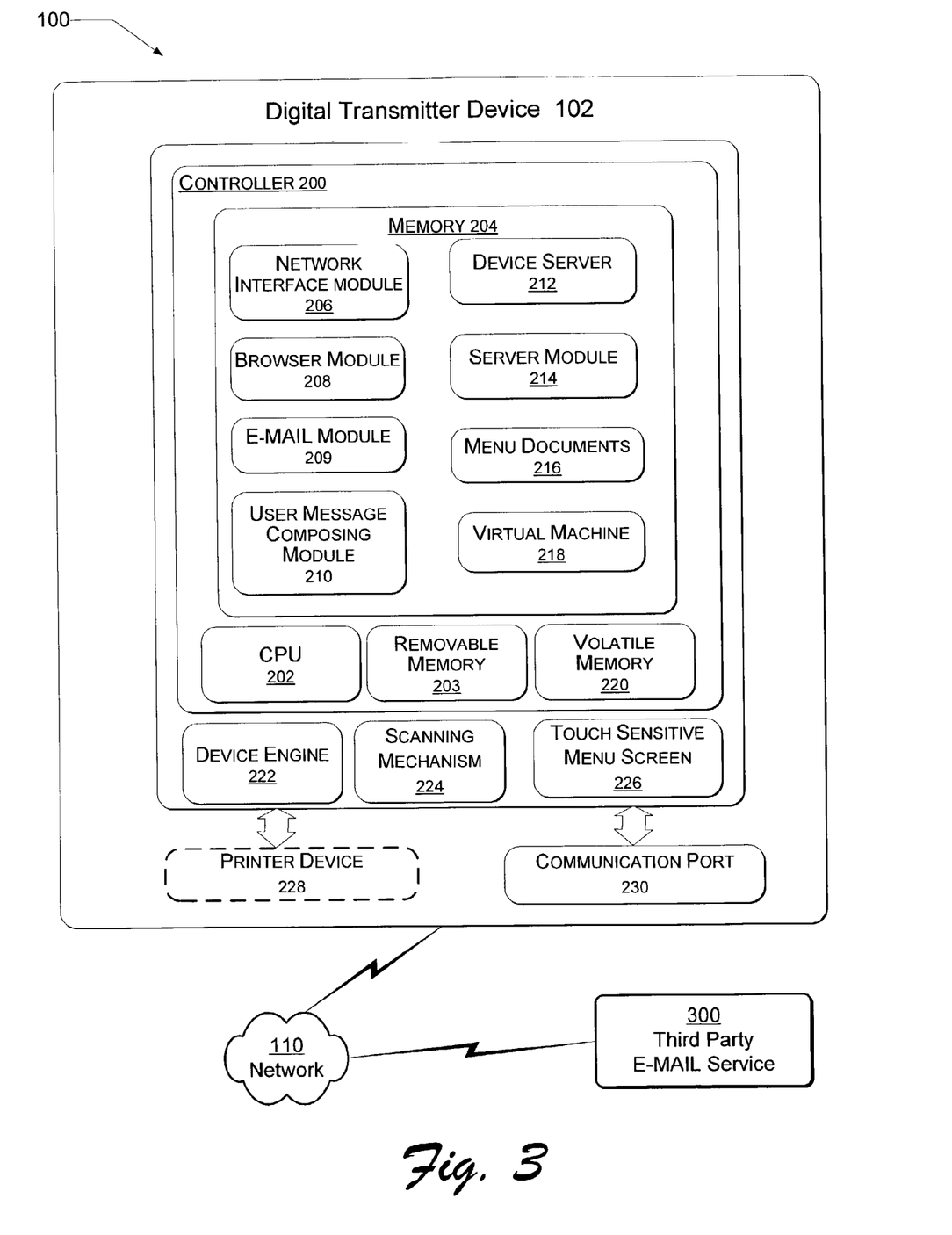
FIG. 3 is a block diagram, according to an embodiment of the present invention, illustrating a digital transmitter device in communication with a network device through a wired or wireless link, where the network device is an electronic mail (e-mail) server.

The system 100 of FIG. 1 includes digital transmitter device 102 as a peripheral device coupled by interconnected network 110 through a wired or wireless link to a variety of network resources. One or more of such network resources is a third-party E-mail server that can be any one of the network resources seen in FIG. 1 at reference numerals 108 and 112. As such, FIG. 3 illustrates an embodiment of the system 100 of FIG. 1 in greater detail.

In accordance with still other aspects of the present invention, digital transmitter device 102 may be included within a multiple function peripheral (MFP) device. As its name implies, the MFP device is configured to provide multiple functions. In this example, the functions provided by the MFP device include those provided by digital transmitter device 102 and a printer device 228. Consequently, the user of digital transmitter device 102 may also print out a hardcopy of any applicable portions of data stored in association with an e-mail account at an e-mail server or otherwise acquired by digital transmitter device 102.

In general, digital transmitter device 102 includes a controller 200 to execute one or more programs. One such program in a browser module 208, such as a network browser or an Internet browser program. A network browser is a software or firmware application used to locate and display pages, such as Web pages. Depending upon the capabilities of the digital transmitter device, the network browser can be a graphical browser that can display graphics as well as text, and can also present multimedia information, including sound and video. When required, the controller 200 may execute browser module 208 that is associated with one or more plug-ins so as to be compatible with various multimedia information.

Another program that can be executed by controller 200 is a program that can transform data received from interconnected network 110 from a network resource to a driver format suitable for printing with integral printer device 228, such as a mark up language format (e.g. SMGL, HTML, or XML), or such as a job language format (e.g. PCL or postscript). Printer device 228 can have the capability of converting the data and then outputting it onto an appropriate print media, such as paper, transparencies or glossy photo paper. By way of example, e-mail messages stored at a third party e-mail server 300 can be retrieved by digital transmitter 102 for printing by printer device 228.

Digital transmitter device 102 includes one or more CPUs 202 each of which is operatively coupled to a non-volatile memory 204, and a user interface that includes an input device. Preferably, the input device will be locally accessible at digital transmitter device 102. By way of example, the input device can be a touch sensitive menu screen 226. Digital transmitter device 102 also includes a scanning mechanism 224 and at least one communication port 230 for interfacing with the interconnected network 110. When included in an MFP device, CPU(s) 202 would also be operatively coupled to printer device 228, for example. CPU(s) 202 is representative of any hardware, firmware and/or software that is configured to perform certain functions associated with the operation of digital transmitter device 102. Hence, as those skilled in the art will recognize, CPU(s) 202 may include dedicated logic and/or one or more processors, FPGAs, ASICs, or other like hardware configured in accord with software/firmware instructions, for example.

Memory 204 is representative of any type of data storage mechanism that can be accessed by at least CPU(s) 202. Memory 204 may therefore include, for example, some form of random access memory (RAM); some form of read only memory (ROM), and/or other like solid-state data storage mechanism. Memory 204 may include a magnetic and/or optical data storage mechanism. Scanning mechanism 224 is representative of any optical scanner technology that may be employed to produce scanned object data upon scanning an object. Such scanning technologies are well known. The resulting scanned object data is provided to CPU 202 and/or stored in memory 204.

Controller 200 of digital transmitter device 102 can process data retrieved from third party e-mail service 300. The controller 200 typically includes data processing unit or CPU 202, a volatile memory 220 (i.e., RAM), and non-volatile memory 204 (e.g., ROM, Flash). Digital transmitter device 102 also includes a device engine 222. The touch sensitive menu screen 226 acts as a local user interface for digital transmitter device 102 by displaying menu pages and accepting user input based on selectable menu items displayed on the menu pages. The touch sensitive menu screen 226 can be used to display a menu page, such as through execution of browser module 208, which asks for and receives input from a user of a URL of an e-mail server and a log on sequence of an e-mail account at third party e-mail service 300. This input can be used by browser module 208 to open a dialog with third party e-mail service 300 and thereafter gain access to the e-mail account using the log on sequence. Third party e-mail service 300 may execute an access control procedure against the input log on sequence to test whether the attempt to gain access should be granted. When such access has been granted, one or more e-mail addresses stored in an address book maintained at the e-mail account can be retrieved from third party e-mail service 300. E-mail can then be addressed to each retrieved e-mail address to which to image data that is scanned with scanning mechanism 224 is to be transmitted. This transmission can be performed, such as through execution of network interface module 206 and e-mail module 209, via interconnected network 110.

Controller 200 processes data and manages device functions by controlling device engine 222 and by responding to input from touch sensitive menu screen 226. Controller 200 includes device driver software/firmware in a device server 212 that is stored in memory 204 and executed on CPU(s) 202. Memory 204 also includes a server module 214 configured to serve or render menu documents 216 to the touch sensitive menu screen 226. The server module 214 is a local server in the sense that it is present within the same digital transmitter device 102 to which it serves menu documents 216.

Menu documents 216 are interpreted by the server module 214 and are configured to display textual and/or graphical information as menu pages on the touch sensitive menu screen 226. When the display of a network browser application that is typically used to access an e-mail account at third party e-mail service 300 is larger than the touch sensitive menu screen 226, the display can be programmatically adapted by controller 200 executing browser module 208. This adaptation can be a scaling of the display to a smaller size. The adaptation can also omit unnecessary or less useful display portions of the browser screen. Alternatively, or in addition, the browser screen can be parsed in the adaptation into an indexed series of displays that digital transmitter device 102 can sequentially output to the touch sensitive menu screen 226 according to the index. Input from a user can then be received from the indexed displays so as to access and retrieve data from the e-mail account at third party e-mail server 300. Other adaptation modes for respective display capabilities of digital transmitter devices are also contemplated and are thus intended to be within the scope of the invention.

Menu documents 216 driving the menu pages can include script code that is associated with graphical keys. The term "script code" is intended herein to mean any one of a variety of different code types. Various kinds of code are contemplated. By way of example and not by way of limitation, the code can be implemented in embedded script code, in firmware, in a native code such as C++ code, or can be in JAVA script. The code can be written in JavaScript code that is interpreted and executed on a Java Virtual Machine (JVM). The code can also be written in other script code languages such as VBScript or Perl.

Selecting a menu item by pressing a graphical key on the touch sensitive menu screen 226 triggers an event which causes a "virtual machine" 218 to interpret and execute the script code associated with the selected graphical key. The virtual machine 218 is a software module stored in memory 204 that executes on CPU(s) 202 to interpret and execute script code. The script code is associated with selectable menu items (i.e., graphical keys or buttons). One menu item is configured to perform the task of initiating a scan of an image using scanning mechanism 224. Another menu item can be configured to perform the task of receiving input of a URL and log on script for a specific e-mail account and address at third party e-mail service 300 from which e-mail account data is to be retrieved via interconnected network 110 as seen in FIG. 3. Still another menu item is configured to perform the task of initiating a retrieval of e-mail address data that was previously stored in an e-mail address book kept by third party e-mail service 300, which task is performed by execution of one or more of network interface module 206, browser module 208, and e-mail module 209 by controller 200. When one or more of modules 206, 208, and 209 are executed, e-mail address information can be requested and retrieved from an e-mail account at third party e-mail service 300 so that it can be used for sending e-mail thereto, as well as be displayed upon touch sensitive menu screen 226. When the e-mail address information is retrieved, the user can select a displayed e-mail address to which an e-mail transmission is directed over a wired and/or wireless link through interconnected network 110. Alternatively, the user can directly enter a specific e-mail address into the digital transmitter device 102 using touch sensitive menu screen 226.

Controller 200 can execute a user message compositing module 210 that allows a user to compose text, graphics, and other input into an e-mail message. A text editor can be a part of user message compositing module 210. Alternatively, user message compositing module 210 can execute in conjunction with utilities made available at a Website that accesses an e-mail account at third party e-mail service 300. The Website may permit a user various capabilities for composing an e-mail message, any one of which can be an interfacing function with the execution of user message compositing module 210. A discussion of various aspects of these capabilities follow.

Capabilities for Digital Transmitter Through
Network Access to E-mail Account

By access to an e-mail account at a third party e-mail service, a user of a digital transmitter device can perform those functions that the Website of the e-mail service provides. Text can be retrieved from one or more data storage areas associated with the e-mail account. This text can be a template or a boiler plate text item. The Website may provide the user with functionality to add color and style and may also provide a rich-text editor. A spell checker, thesaurus, and/or dictionary functionality may also be provided. The Website may also perform requests from the digital transmitter for data encryption tasks, the result of which can then be downloaded by the digital transmitter device. Markup language strings and hyperlinks can be retrieved for use at the digital transmitter device. For instance, a markup language string can be retrieved that specifies where on Web page a section of text is to be presented in a document that will be transmitted in an e-mail from the digital transmitter device.

Language choices may be provided by the third party e-mail server Website, as well as options for creating headers and footers for text documents. Files can be retrieved from the one or more data storage areas associated with the e-mail account. These files include media files such as digital photographs, sound files, video files, and data files. Executable files and signature image files can also be retrieved. While the digital transmitter device can retrieve data associated with an e-mail account at a third party e-mail server, data can also be uploaded from the digital transmitter for storage.

One or more address books for e-mail addresses can be maintained at the e-mail account by executing the browser module 208 with the controller 200 of the digital transmitter device 102. The Website for the third party e-mail service 300 may allow a user of the digital transmitter device 102 to input abbreviations that will programmatically translate into full e-mail addresses in the one or more address books. E-mail addresses can be retrieved in various groupings, including distribution lists and newsgroups.

Access to another e-mail address of another e-mail server and reply to an e-mail in the in-box at that e-mail server from the digital transmitter device 102 may also be achieved. The digital transmitter device 102 can access other e-mail servers using any of a variety of different protocol, such as Post Office Protocol (POP) to retrieve e-mail from another ISP or other POP. As such, controller 200 executes processes resident in a network interface module 206 and e-mail module 209 for transmission over a wired and/or wireless link to interconnected network 110 for delivery to the e-mail server corresponding to a URL for a specific e-mail account retrieved by the digital transmitter device.

When a user enters a command displayed upon touch sensitive menu screen 226 to start a scanning operation, the user places a set of documents into a sheet feeder device associated with digital transmitter device 102. The sheet feeder device then physically feeds each sheet in the set of documents to scanning mechanism 224. The one or more CPUs 202 then generates a document in a first format from the scanned image that is a bit map or other digital representation of the scanned documents. The one or more CPUs 202 can then convert the document from the first format into a second format. The scanned object data in the first, second or both formats may be included in e-mail message data as an attached file that is transmitted by the digital transmitter device in an e-mail transmission. The first and second formats can be one or more of the following formats: Portable Document Format (PDF) formatted data, graphic image file format (GIFF) formatted data, tagged image file format (TIFF) formatted data, Joint Photographic Experts Group (JPEG) formatted data, bit-map formatted data, optical character recognition (OCR) related data, American Standard Code for Information Interchange (ASCII) formatted data, and/or other forms of encoded data, including, e.g., encrypted data, etc.

When the user enters a command displayed upon touch sensitive menu screen 226 to enter or retrieve an e-mail address, digital transmitter device 102 coordinates the input of the e-mail address. Controller 200 then executes one or more routines, such as user message compositing module 210, that assemblies message data. The message data so assembled includes the e-mail address retrieved, input or otherwise designated by the user, the bit map or other output that is a digital representation of the scanned documents, and can also include any message text retrieved, composed, or entered by the user upon touch sensitive menu screen 226. The message data is then sent by a wired and/or wireless link over interconnected network 110 to the addressed location.

CPU(s) 202 is configured to perform the operations described above using various executable modules of memory 204. The network interface module 206, the browser module 208, the e-mail module 209 and the user message compositing module 210 can each be implemented in software or firmware.

In one embodiment of the invention, e-mail module 209 receives one or more e-mail addresses from one or more of third party e-mail service 300, input of an e-mail address from a user at touch sensitive menu screen 226, or by retrieval of a list of stored e-mail addresses at digital transmitter device 102. These e-mail addresses can be displayed on touch sensitive menu screen 226 in a list for further selection by the user. The list can be sorted alpha-numerically. The user can either select from among the displayed e-mail addresses or input the characters of a specific e-mail address, as discussed below with respect to FIG. 5.

Figure 4:
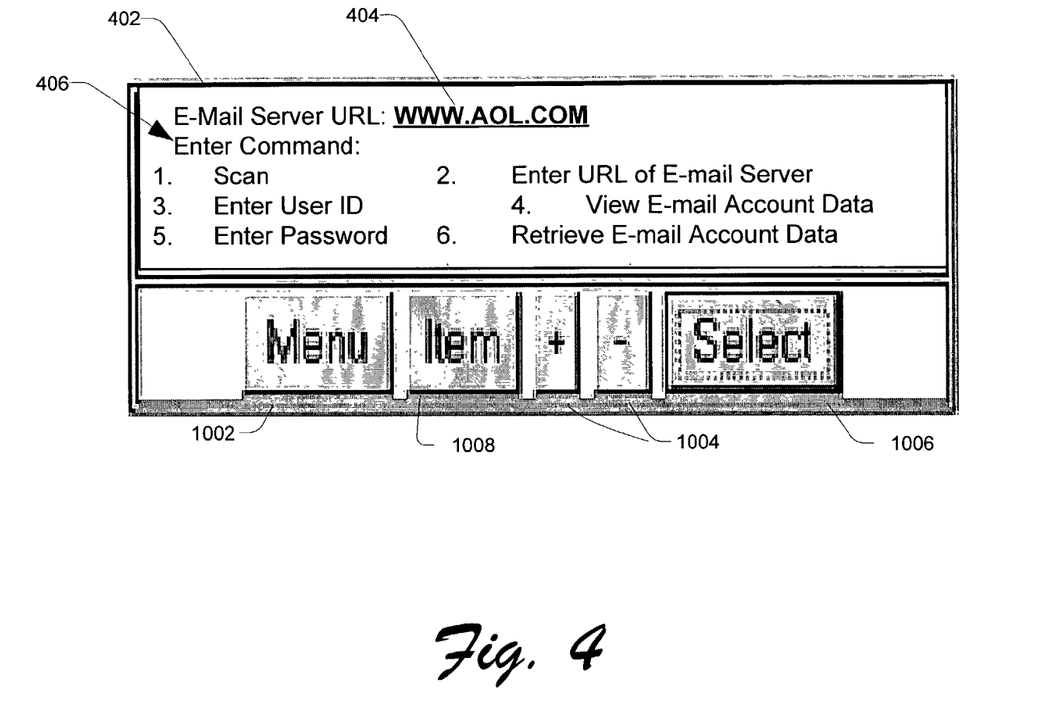
FIG. 4 illustrates an example of a menu page that might be displayed on a touch sensitive menu screen of a digital transmitter device, according to an embodiment of the present invention.

Examples of various commands 406 that can be selected by a user from a menu screen 402 are displayed upon touch sensitive menu screen 226 of digital transmitter device 102 as seen in FIG. 4. A URL has already been entered, seen at reference numeral 404, and displayed upon menu screen 402. When the user selects option "1", digital transmitter device 102 activates scanning mechanism 224 to scan in documents as discussed above. When the user selects option "2", a menu screen is displayed to receive input from the user of a URL of an E-mail server. When the user selects option "3", a menu screen is displayed to receive input from the user of a User ID. When the user selects option "4", a menu screen is displayed to receive input from the user that designates the data associated with a requested e-mail account that is to be retrieved for display upon touch sensitive menu screen 226. When the user selects option "5", a menu screen is displayed to receive input from the user of a password needed to gain access to an e-mail account at third party e-mail service 300. When the user selected option "6", a menu screen is displayed to receive input from the user of which data associated with a requested e-mail account is to be retrieved for storage at digital transmitter device 102.

Figure 5:
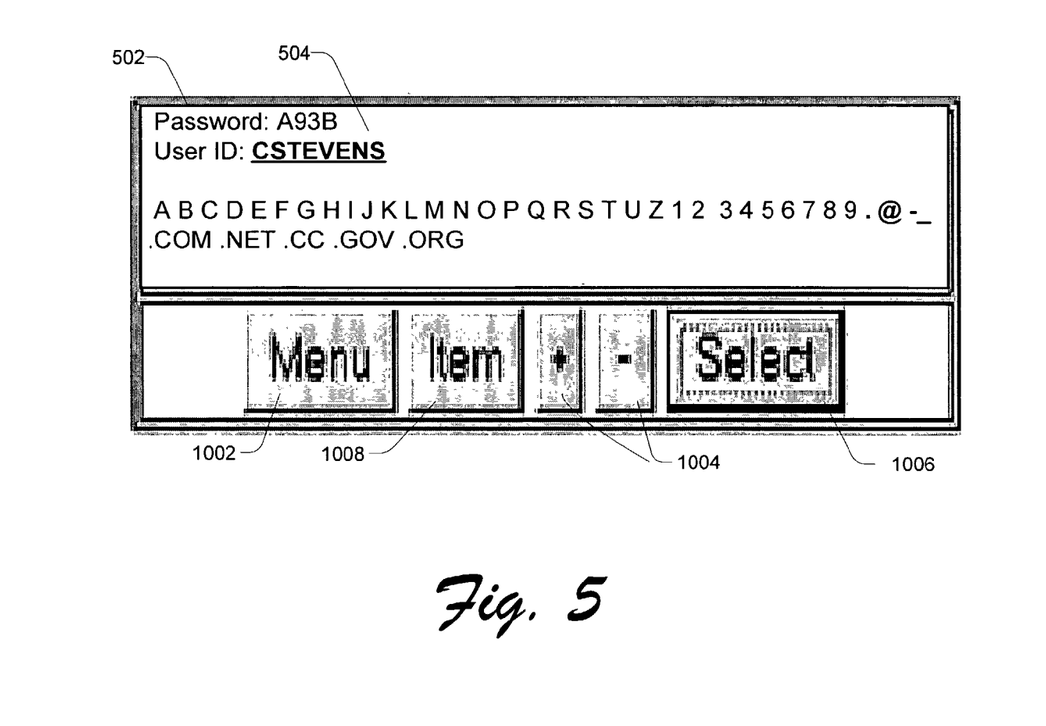
FIG. 5 illustrates an example of a menu page that might be displayed on a touch sensitive menu screen of a digital transmitter device, according to an embodiment of the present invention.

By way of example of the foregoing user-selectable options displayed on touch sensitive menu screen 226, FIG. 5 shows the result of option 3 being selected at menu screen 402 in FIG. 4 and the user then directly entering on a menu screen 502 of FIG. 5 each character of a User ID using virtual buttons displayed upon the menu screen. After menu screen 402, menu screen 502 is displayed upon touch sensitive menu screen 226 of digital transmitter device 102. Menu screen 502 shows a practical example of a user selecting characters for a desired User ID. Here, the User ID can be the same as an e-mail address corresponding to the e-mail account. Menu screen 502 is presented by script code executing in CPU(s) 202 that allows the user to see alphabetic and symbolic characters by depressing virtual buttons 1004 to move forward and backward through a displayed hierarchical list of available alphabetic and symbolic characters. Script code executes in CPU(s) 202 to enable a user to select a displayed character by depressing virtual button 1006. The user can select a sequence of characters by depressing virtual buttons 1004 to thereby move forward and backward through the sequence of characters. Alphabetic and symbolic sequences of characters can be selected by the user on menu screen 502. By depressing virtual button 1006, the user can select a particular sequence of characters that is displayed. Menu screen 502 shows that a user has entered a User ID "CSTEVENS" for the URL WWW.AOL.COM. Thus, a corresponding e-mail address of the user might be "cstevens@aol.com."

As seen in menu screen 502, the sequence of characters can be selected by the user by depressing virtual button 1006. The user then select one character by depressing virtual buttons 1004 to thereby move forward and backward through the characters. Then, when virtual button 1006 is depressed on menu screen 502, the user sees a transition back to menu screen 402 where the user can enter another command as discussed above.

Digital transmitter device 102 then assembles message data to be transmitted in one or more e-mail transmissions over interconnected network 110 to corresponding e-mail addresses that were retrieved, selected, or otherwise entered by the user, as discussed above. Other virtual buttons on the touch sensitive menu screen 226 are also contemplated in order to provide for the initiation of other or additional functions by the user, such as an item virtual item button 1008 seen in FIGS. 4-5.

Exemplary Embodiment of An E-Mail Account Website

Figure 6:
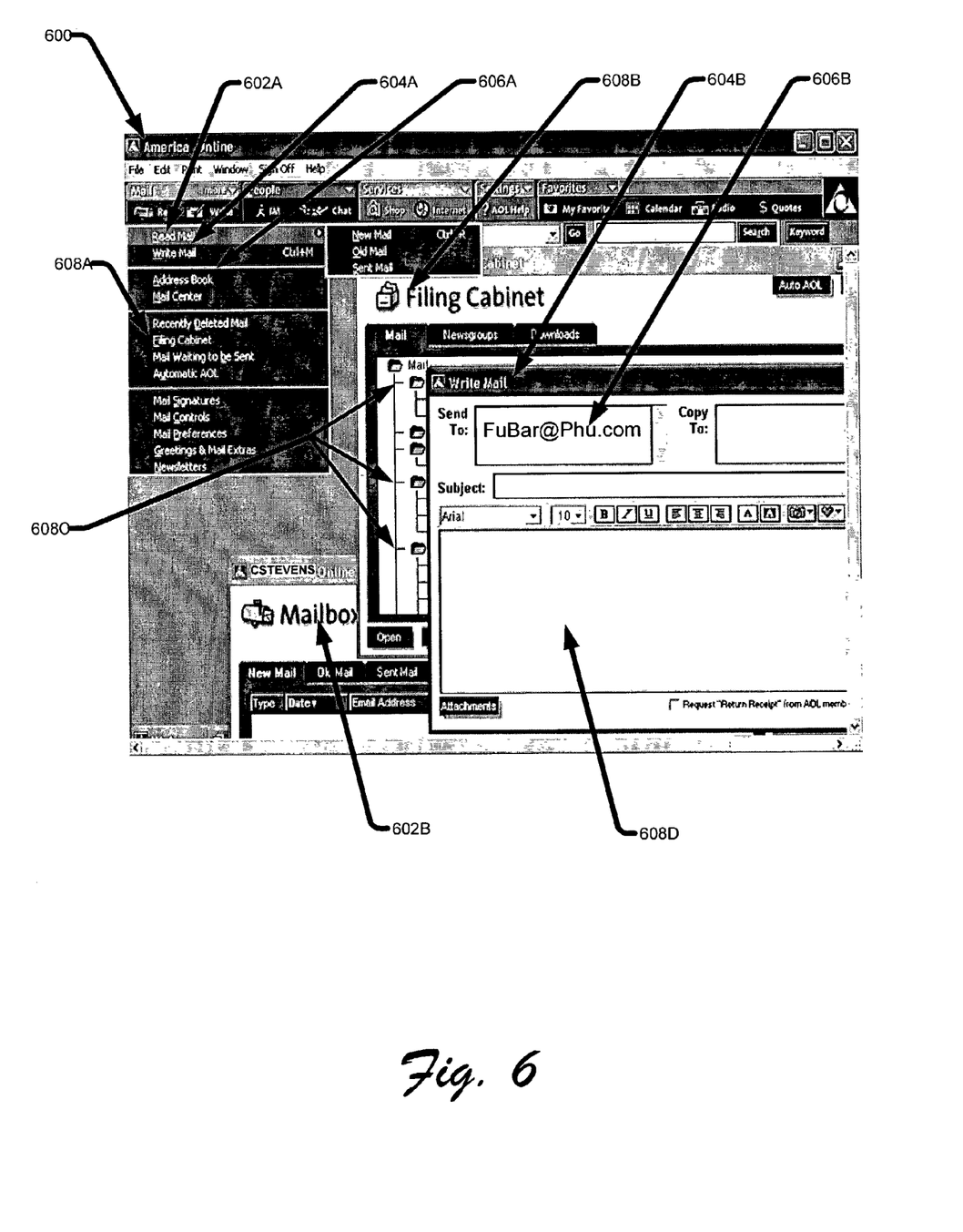
FIG. 6 illustrates an example of a browser display screen that might be displayed on display of a digital transmitter device, according to an embodiment of the present invention.

FIG. 6 shows an example of an e-mail account Web page 600 for the e-mail account "CSTEVENS" at the third party e-mail service having a Universal Resource Locator (URL) of AOL.COM." Reference numerals 602A, 602B are, respectively, the command and responsive display to read e-mail messages for the e-mail account. Reference numerals 604A, 604B are, respectively, the command and responsive display to write e-mail messages to be transmitted from the e-mail account at the third party e-mail service to one or more e-mail addresses. Note that any objects scanned and digitized at the digital transmitter can be uploaded or otherwise transmitted to the third party e-mail service. The third party e-mail service can then transmit the digitized objects from the e-mail account in one or more e-mail messages to respective e-mail addresses. Reference numerals 606A, 606B are, respectively, the command and responsive display to retrieve one or more e-mail addresses stored in one or more address books associated with the e-mail account. Reference numeral 608A is a command to retrieve various data stored in association with the e-mail account. Reference numeral 608B shows the icon "Filing Cabinet" to signify a data storage location in which data is stored in association with the e-mail account. Reference numeral 608C shows a plurality of folders in the Filing Cabinet, each signifying a discrete location in the Filing Cabinet at which particularized types and kinds of data can be stored. Reference numeral 608D shows a display of a work area for composing message data to be sent in an e-mail. The user can enter text directly into this area using the input device. Data (e.g. text, media, symbols, etc.) can be retrieved from data storage associated with the e-mail account for entry into this area. After the data has been entered, the e-mail can be sent by entry of a corresponding command.

Exemplary Embodiment of An E-Mail Template

Figure 7:
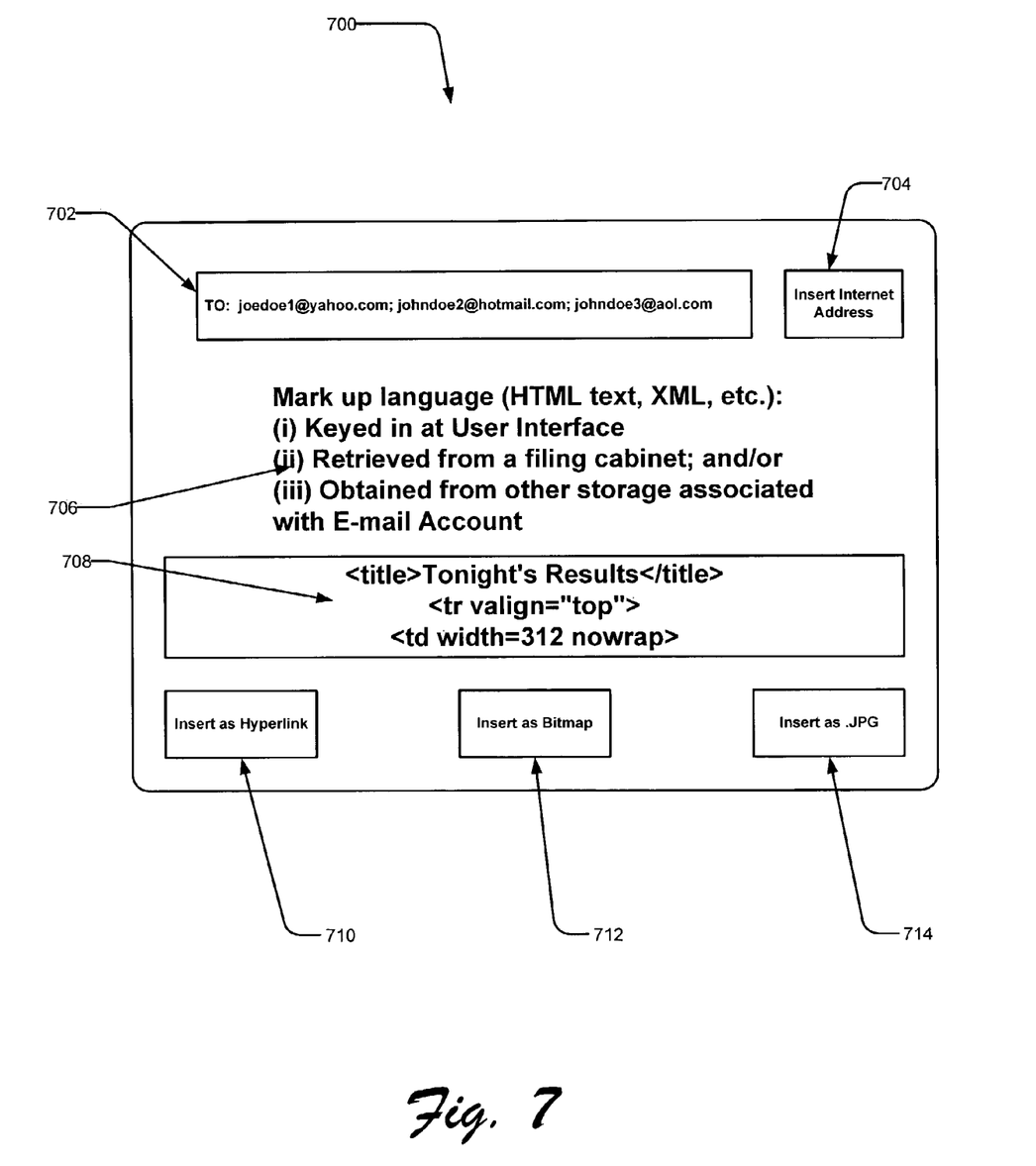
FIG. 7 illustrates an example of an e-mail message that might be authored by a user of a digital transmitter device that is in communication with an e-mail account of an e-mail server, according to an embodiment of the present invention.

FIG. 7 shows a template, by way of example, that can be filled in by a user retrieving data that is in storage in association with an e-mail account. At reference numeral 702, e-mail addresses can be retrieved for entry into the template. At reference numeral 704, a URL of a Website or other Internet address can be inserted after it has been retrieved from data associated with the e-mail account. At reference numeral 706, various markup language strings can be entered which are, respectively, (i) keyed in at the user interface of the digital transmitter device, (ii) retrieved from the filing cabinet 608B seen in FIG. 6, and/or (iii) obtained from other data storage that is associated with the e-mail account. Markup strings can be used to fill in semantic expressions, such as seen at reference numeral 708 (e.g. XML strings). By similar retrieval of the source of data described above, a hyperlink can be inserted at reference numeral 710, a bitmap at reference numeral 712, and a "*.JPG" file inserted at reference numeral 714.

Exemplary Embodiment of An E-Mail Account Access Routine

Figure 8:
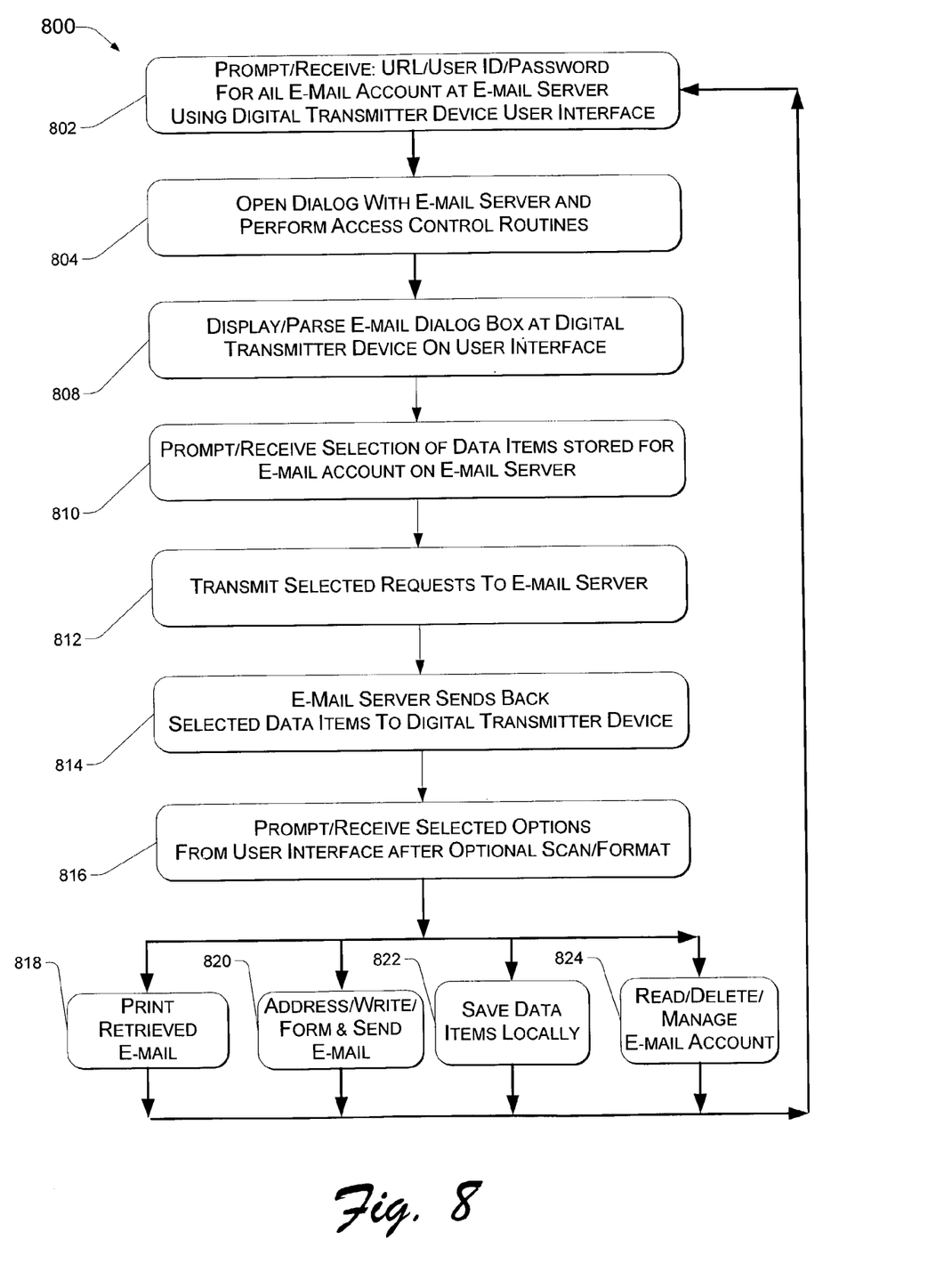
FIG. 8 is a flow diagram, according to an embodiment of the present invention, depicting a method for use in a computing and communication environment having a digital transmitter device in a system as in FIG. 1, for example, in accordance with certain exemplary embodiments of the present invention.

With this in mind, CPU(s) 202 can be configured to perform the operations described above. By way of further example, a flow diagram is depicted in FIG. 8 to illustrate certain exemplary functions that can be performed using CPU 202 and the other resources in digital transmitter device 102. Here, a process 800 is provided.

In step 802, digital transmitter device 102 displays a prompt upon touch sensitive menu screen 226. The prompt solicits input from a user for a URL, an e-mail account User ID, and a password for a third party e-mail service using a user interface, as discussed above with respect to FIGS. 4 and 5. The digital transmitter device 102 then receives such input from the user. In order to display the prompt, it is preferable that the server module 214 of memory 204 in digital transmitter device 102 serves a menu page that is stored in menu documents 216 to CPU 202 for execution of script code. The script code being executed by CPU 202 effects a function to be performed by digital transmitter device 102, such as receiving input from a user that is entered upon touch sensitive menu screen 226, or the initiation of a function by the user depressing a function related virtual button that is displayed upon touch sensitive menu screen 226. The script code will preferably be executed in conjunction with an interpretation of the menu page. Note that in certain implementations, the menu page can be directly interpreted by script code executing on CPU 202 without any prior storage in menu documents 216 or use of server module 214 in digital transmitter device 102.

At step 804, a dialog is opened over an interconnected network with the third party e-mail service designed in the input from the user. An access control procedure may be conducted at the third party e-mail service against the User ID and password input by the user. Access may be denied or granted by the third party e-mail service. At step 808, access to the e-mail account has been granted by the third party e-mail service and a browser display is displayed upon a display of the digital transmitter device. Depending upon the size of the display, the browser display may need to be parsed or indexed, as described above. At step 810, the user is prompted to select data that is stored in association with the e-mail account with respect to the third party e-mail service. The user's selection is displayed upon touch sensitive menu screen 226 as the input is received. One or more displays may be required to be displayed on the display of the digital transmitter device in order for the user to make all desired data selections. Each such display will show a menu screen listing data that can be selected along with a prompt to the user to select a particular displayed data item. The user's selection of each data item on each prompt is received by input upon the touch sensitive menu screen 226.

After step 810, process 800 is moved to step 812 where the requested selections are transmitted to the third party e-mail service for a retrieval process for each of the requested data items. At step 814, the third party e-mail service has retrieved each of the requested data items and sends them back over the interconnected network to the requesting digital transmitter device. At step 816, the user is prompted for a choice as to a following option that could be taken with respect to the retrieved data items.

If, at step 816, the user selected to print requested e-mail messages that were retrieved in step 814, such as the entire e-mail message, including attachments, process 800 moves to step 818 where the printing occurs. Printing may involve submission of the e-mail message to a print rendering engine module executed by controller 200 as may be found in memory 204 in FIG. 3. As such, the e-mail message might be parsed to divide the various formats of data in the e-mail message among various software renderers. The renderers include those for American Standard Code for Information Interchange (ASCII) formatted data formats, for various word processor formats such as Corel Word Perfect® software data formats, Microsoft Word® software data formats, for various spread sheet data formats, as well as renderers for other data formats such as Portable Document Format (PDF) formatted data. Other renderers for other data formats are also contemplated by the present invention, including but not limited to a presentation software data format such as the Microsoft Power Point® software data format, tagged image file format (TIFF) formatted data, Joint Photographic Experts Group (JPEG) formatted data, bit-map formatted data, optical character recognition (OCR) related data, and/or other forms of encoded data, including, e.g., encrypted data, etc. The result of the various renderers can then be consolidated in a driver format suitable for printing with integral printer device 228, such as a mark up language format (e.g. SMGL, HTML, or XML), or such as a job language format (e.g. PCL or postscript). A report, hard copy, or print out is made and process 800 returns to step 802 to repeat the foregoing, beginning with a prompt being again displayed upon the touch sensitive menu screen 226.

If, at step 816, the user selects the option to address e-mail messages, write e-mail messages, form e-mail messages from data to be retrieved from a storage area associated with the e-mail account, or send e-mail messages, then process 800 moves to step 820 where various menu screens are displayed upon touch sensitive menu screen 226 of FIG. 3 for receiving user input. The user input will be used by the digital transmitter device to perform the request e-mail related functions. The option at step 820 can also be used, in general, to retrieve data that is stored so as to be associated with the e-mail account. This retrieved data can then be used in other ways by the digital transmitter device.

If, at step 816, the user selects the option to save data locally, then process 800 moves to step 822 where any data items that were previously retrieved from a data storage area associated with the e-mail account will be stored in memory 204 of digital transmitter device 102. If, at step 816, the user selects to read e-mail, delete e-mail, or to manage the e-mail account to which access has been gained by the digital transmitter device, then process 800 moves to step 824 when various menu screens of a network browser are displayed on the digital transmitter, such as are seen in FIG. 6, so that an in box, out box, sent box, delete box, and any other storage area associated with the e-mail account can be maintained through the various menu screens.

Accordingly, methods, apparatuses, digital transmitter devices, and programs are provided that allow a digital transmitter device to open a dialog with an e-mail server over a network, such as the Internet, using a network browser application, such as an Internet browser. The digital transmitter device allows a user to operate the network browser application to use the functionality provided to an e-mail account through a Web hosting server of a third party e-mail service provider. The browser application can be operated to digitally send scanned documents with customized e-mail messages instead of basic or boiler plate text messages. The convenience of a preconfigured e-mail account accessible through the network can be utilized by the user with the digital transmitter device. This convenience includes storage of data, e-mail address books, and other information rather than storage at the digital transmitter device. Digitally scanned documents are made available as attachments to e-mail messages or can be sent as follow-on messages to one or more of the e-mail addresses that are associated with the e-mail account at the e-mail server. As such, functionality that is not provided by the digital transmitter device can be provided through on-line access to an e-mail account. Proven Internet functionality is added so as to eliminate the need for complicating firmware in the digital transmitter device. Once Internet interaction capability has been implemented in the digital transmitter device, the need to increase the e-mail functionality is off loaded onto other programs or services provided by the Web hosting service for the e-mail account. A user interface at the digital transmitter device, which can include the functionality of a monitor, a mouse, and/or a touch pad for use with the browser application, allows a user to use sophisticated formatting tools for an e-mail message by using the capabilities of the Web hosting service for the e-mail account.

The foregoing Detailed Description has set forth an example of transmitting an e-mail message from a digital transmitter device. Embodiments of the present invention contemplate other types of data that can also be addressed and transmitted from a digital transmitter device to an electronic address, including those now known and those yet to be developed. As such, and in addition to an e-mail message transmission, embodiments of the present invention include a transmission from a digital transmitter device to an electronic address that includes an address of a network resource on a network and a destination location thereat. By of example, and not by way of limitation, the electronic address can be a file folder address at a server on a network and can also be a Web site address at a server on a network.

Thus, although some preferred embodiments of the various methods, apparatuses, system, and programs of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. A digital transmitter device comprising:
    a scanning mechanism configured to optically scan at least one object to form corresponding scanned object data in a first data format; and
    one or more modules configured to convert the scanned object data in the first data format into a second data format,
    wherein, over an interconnected network, the one or more modules are configured to access an e-mail account at an e-mail server, request data associated with the e-mail account from the e-mail server, and receive the requested data associated with the e-mail account from the e-mail server,
    wherein the one or more modules are configured to display a dialog box for the e-mail account of the e-mail server on a user interface of the digital transmitter device and receive user selection of the requested data associated with the e-mail account via the user interface, wherein the one or more modules are configured to form an e-mail message using the requested data received from the e-mail server and the scanned object data in the second data format, and wherein, over the interconnected network, the one or more modules are configured to deliver the e-mail message to one or more network resources using the e-mail account of the e-mail server.

2. The digital transmitter device as defined in claim 1, wherein the requested data includes an e-mail address, and wherein the one or more modules are configured to address the message data for delivery to the e-mail address.

3. The digital transmitter device as defined in claim 1, wherein the requested data includes one or more of data selected from the group consisting of one or more e-mail addresses, one or more text templates, one or more banners, one or more advertisements, one or more emoticons, one or more logos, one or more clip art items, one or more icons, one or more signatures, one or more media files, one or more data files, and one or more executable files.

4. The digital transmitter device as defined in claim 1, wherein the one or more modules are further configured to:
   display a network browser user interface;
   receive input from the network browser user interface; and
   direct a network browser application, responsive to the received input, to browse the interconnected network.

5. The digital transmitter device as defined in claim 1, wherein the one or more modules are further configured to receive input for gaining access to the e-mail account at the e-mail server.

6. The digital transmitter device as defined in claim 1, wherein the second data format is selected from the group consisting of an ASCII formatted data format, a word processor format, a spread sheet data format, a PDF data format, a presentation software data format, a GIFF data format, a TIFF data format, a JPEG data format, a bit-map data format, an OCR data format, and an encoded data format.

7. The digital transmitter device as defined in claim 1, wherein the one or more modules are configured to access the e-mail account of the e-mail server via a network browser application operating on the digital transmitter device, wherein the network browser application enables functionality of the e-mail account at the digital transmitter device.

8. A computer-readable medium encoded with computer-executable instructions which, when executed by a digital transmitter device including a scanning mechanism, direct the digital transmitter device to perform a method comprising:
   optically scanning with the scanning mechanism at least one object to form corresponding scanned object data in a first data format;
   converting the scanned object data in the first data format into a second data format;
   addressing one or more transmissions for delivery over an interconnected network from the digital transmitter device to an e-mail server, the one or more transmissions including:
      a request for access to an e-mail account at the e-mail server; and
      a request for data associated with the e-mail account;
   receiving one or more transmissions at the digital transmitter device from the e-mail server, the one or more transmissions including:
      the data associated with the e-mail account;
      forming an e-mail message using the data associated with the e-mail account and the scanned object data in the second data format; and
      transmitting the e-mail message over the interconnected network from the digital transmitter device to one or more network resources using the e-mail account of the e-mail server,
   wherein addressing the one or more transmissions for delivery over the interconnected network from the digital transmitter device to the e-mail server includes displaying a dialog box for the e-mail account of the e-mail server on a user interface of the digital transmitter device and receiving user selection of the requested data associated with the e-mail account via the user interface.

9. The computer-readable medium as defined in claim 8, wherein the data associated with the e-mail account includes one or more of data selected from the group consisting of one or more e-mail addresses, one or more text templates, one or more banners, one or more advertisements, one or more emoticons, one or more logos, one or more clip art items, one or more icons, one or more signatures, one or more media files, one or more data files, and one or more executable files.

10. The computer-readable medium as defined in claim 9, wherein transmitting the e-mail message over the interconnected network from the digital transmitter device to one or more network resources comprises addressing the e-mail message to the one or more e-mail addresses corresponding, respectively, to the one or more network resources.

11. The computer-readable medium as defined in claim 8, wherein the second data format is selected from the group consisting of an ASCII formatted data format, a word processor format, a spread sheet data format, a PDF data format, a presentation software data format, a GIFF data format, a TIFF data format, a JPEG data format, a bit-map data format, an OCR data format, and an encoded data format.

12. The computer-readable medium as defined in claim 8, wherein addressing the one or more transmissions for delivery over the interconnected network from the digital transmitter device to the e-mail server includes accessing the e-mail account of the e-mail server via a network browser application operating on the digital transmitter device, wherein the network browser application enables functionality of the e-mail account at the digital transmitter device.

13. A digital transmitter device comprising:
   a scanning mechanism configured to scan an image; and
   a controller including at least a network interface module, a browser module, and an e-mail module operatively coupled and configured to access an e-mail account of an e-mail server having an address on a network, retrieve data stored in connection with the e-mail account from the e-mail server, form an e-mail message using the retrieved data from the e-mail server and the scanned image, and transmit the e-mail message from the digital transmitter device to one or more network resources via the network using the e-mail account of the e-mail server,
   wherein the browser module is configured to access the e-mail account of the e-mail server via the network interface module, wherein the browser module enables functionality of the e-mail account at the digital transmitter device.

14. The digital transmitter device as defined in claim 13, wherein the browser module displays a dialog box for the e-mail account of the e-mail server on a user interface of the digital transmitter device and receives user selection of the retrieved data stored in connection with the e-mail account via the user interface.

15. The digital transmitter device as defined in claim 13, wherein:

the retrieved data includes one or more items selected from the group consisting of one or more e-mail addresses, one or more text templates, one or more banners, one or more advertisements, one or more emoticons, one or more logos, one or more clip art items, one or more icons, one or more signatures, one or more media files, one or more data files, and one or more executable files; and the transmission of the e-mail message is addressed to the one more e-mail addresses corresponding, respectively, to the one or more network resources.

16. The digital transmitter device as defined in claim 13, wherein the scanned image is formatted by the digital transmitter device into a format selected from the group consisting of an ASCII formatted data format, a word processor format, a spread sheet data format, a PDF data format, a presentation software data format, a GIFF data format, a TIFF data format, a JPEG data format, a bit-map data format, an OCR data format, and an encoded data format.

17. The digital transmitter device as defined in claim 13, further comprising an input device operatively coupled to the controller and configured to receive the address of the e-mail server on the network, receive input for gaining access to the e-mail account, and receive input to select data items stored in connection with the e-mail account so as to be contained in the retrieved data.

18. The digital transmitter device as defined in claim 17, wherein the data items stored in connection with the e-mail account include one or more of data selected from the group consisting of one or more e-mail addresses, one or more text templates, one or more banners, one or more advertisements, one or more emoticons, one or more logos, one or more clip art items, one or more icons, one or more signatures, one or more media files, one or more data tiles, and one or more executable files.

19. The digital transmitter device as defined in claim 17, wherein the input device is selected from the group consisting of a keyboard and a touch sensitive menu screen.

20. The digital transmitter device as defined in claim 19, wherein the touch sensitive menu screen displays a menu page having selectable menu items that include:

one or more menu items to input the address of the e-mail server on the network and the input for gaining access to the e-mail account; and a menu item to initiate the scanning mechanism to optically scan the image.

21. A method comprising:

optically scanning with a scanning mechanism of a digital transmitter device at least one object to form corresponding scanned object data in a first data format;

converting the scanned object data in the first data format into a second data format;

addressing one or more transmissions for delivery over an interconnected network from the digital transmitter device to an e-mail server, the one or more transmissions including:

a request for access to an e-mail account at the e-mail server; and a request for data associated with the e-mail account;

receiving one or more transmissions at the digital transmitter device from the e-mail server, the one or more transmissions including:

the requested data associated with the e-mail account;

forming an e-mail message using the requested data associated with the e-mail account and the scanned object data in the second data format; and transmitting the e-mail message over the interconnected network from the digital transmitter device to one or more network resources using the e-mail account of the e-mail server, wherein addressing the one or more transmissions for delivery over the interconnected network from the digital transmitter device to the e-mail server includes accessing the e-mail account of the e-mail server via a network browser application operating on the digital transmitter device, wherein the network browser application enables functionality of the e-mail account at the digital transmitter device.

22. The method as defined in claim 21, wherein addressing the one or more transmissions for delivery over the interconnected network from the digital transmitter device to the e-mail server includes displaying a dialog box for the e-mail account of the e-mail server on a user interface of the digital transmitter device and receiving user selection of the requested data associated with the e-mail account via the user interface.

23. The method as defined in 22, wherein the requested data associated with the e-mail account includes one or more of data selected from the group consisting of one or more e-mail addresses, one or more text templates, one or more banners, one or more advertisements, one or more emoticons, one or more logos, one or more clip art items, one or more icons, one or more signatures, one or more media files, one or more data files, and one or more executable files.

24. The method as defined in claim 23, wherein transmitting the e-mail message over the interconnected network from the digital transmitter device to one or more network resources comprises addressing the e-mail message to the one or more e-mail addresses corresponding, respectively, to the one or more network resources.

25. The method as defined in claim 23, wherein the second data format is selected from the group consisting of an ASCII formatted data format, a word processor format, a spread sheet data format, a PDF data format, a presentation software data format, a GIFF data format, a TIFF data format, a JPEG data format, a bit-map data format, an OCR data format, and an encoded data format.

* * * * *

UNITED STATES PATENT AND TRADEMARK OFFICE
CERTIFICATE OF CORRECTION

PATENT NO.        : 7,433,068 B2                                            Page 1 of 1
APPLICATION NO.   : 10/222331
DATED             : October 7, 2008
INVENTOR(S)       : Chad Stevens et al.

It is certified that error appears in the above-identified patent and that said Letters Patent is hereby corrected as shown below:

In column 17, line 12, in Claim 15, after "one" insert -- or --.

In column 17, line 37, in Claim 18, delete "tiles," and insert -- files, --, therefor.

In column 18, line 35, in Claim 23, delete "in 22," and insert -- in claim 21, --, therefor.

Signed and Sealed this

Second Day of June, 2009

JOHN DOLL
*Acting Director of the United States Patent and Trademark Office*